United States Patent
Chaiken et al.

(10) Patent No.: US 12,511,129 B2
(45) Date of Patent: Dec. 30, 2025

(54) INFORMATION HANDLING SYSTEM WITH DISPLAY PANEL CRACK AND DISTORTION DETECTION

(71) Applicant: DELL PRODUCTS L.P., Round Rock, TX (US)

(72) Inventors: Craig Chaiken, Pflugerville, TX (US); Ibrahim Sayyed, Georgetown, TX (US); Krishnaveni Sistu, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 250 days.

(21) Appl. No.: 18/350,134

(22) Filed: Jul. 11, 2023

(65) Prior Publication Data

US 2025/0021341 A1    Jan. 16, 2025

(51) Int. Cl.
*G06F 9/44* (2018.01)
*G06F 9/4401* (2018.01)
*G06K 19/06* (2006.01)

(52) U.S. Cl.
CPC ..... *G06F 9/4401* (2013.01); *G06K 19/06037* (2013.01)

(58) Field of Classification Search
None
See application file for complete search history.

(56) References Cited

U.S. PATENT DOCUMENTS

| | | | |
|---|---|---|---|
| 2014/0006988 A1* | 1/2014 | Yamamura | G06F 3/04886 715/765 |
| 2015/0269315 A1* | 9/2015 | Arakita | G06T 7/0016 382/131 |
| 2017/0228280 A1* | 8/2017 | Joshi | G06K 19/06037 |
| 2023/0069282 A1 | 3/2023 | Chung et al. | |
| 2023/0196540 A1 | 6/2023 | Shukla et al. | |
| 2024/0022752 A1* | 1/2024 | Kudekar | H04N 19/136 |

* cited by examiner

*Primary Examiner* — Keshab R Pandey
(74) *Attorney, Agent, or Firm* — Larson Newman, LLP

(57) ABSTRACT

An information handling system includes a display panel, and a basic input/output system (BIOS) in communication with the display panel. The BIOS builds multiple quick response (QR) codes. The BIOS provides the multiple QR codes to the display panel. When displayed the multiple QR codes fill an entire display area of the display panel. The BIOS stores the multiple QR codes in a storage of the BIOS.

18 Claims, 4 Drawing Sheets

INFORMATION HANDLING SYSTEM WITH DISPLAY PANEL CRACK AND DISTORTION DETECTION

FIELD OF THE DISCLOSURE

The present disclosure generally relates to information handling systems, and more particularly relates to detection of cracks and distortion in a display panel.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a display panel, and a basic input/output system (BIOS) in communication with the display panel. The BIOS may build multiple quick response (QR) codes. The BIOS may provide the multiple QR codes to the display panel. When displayed the multiple QR codes fill an entire display area of the display panel. The BIOS may store the multiple QR codes in a storage of the BIOS.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
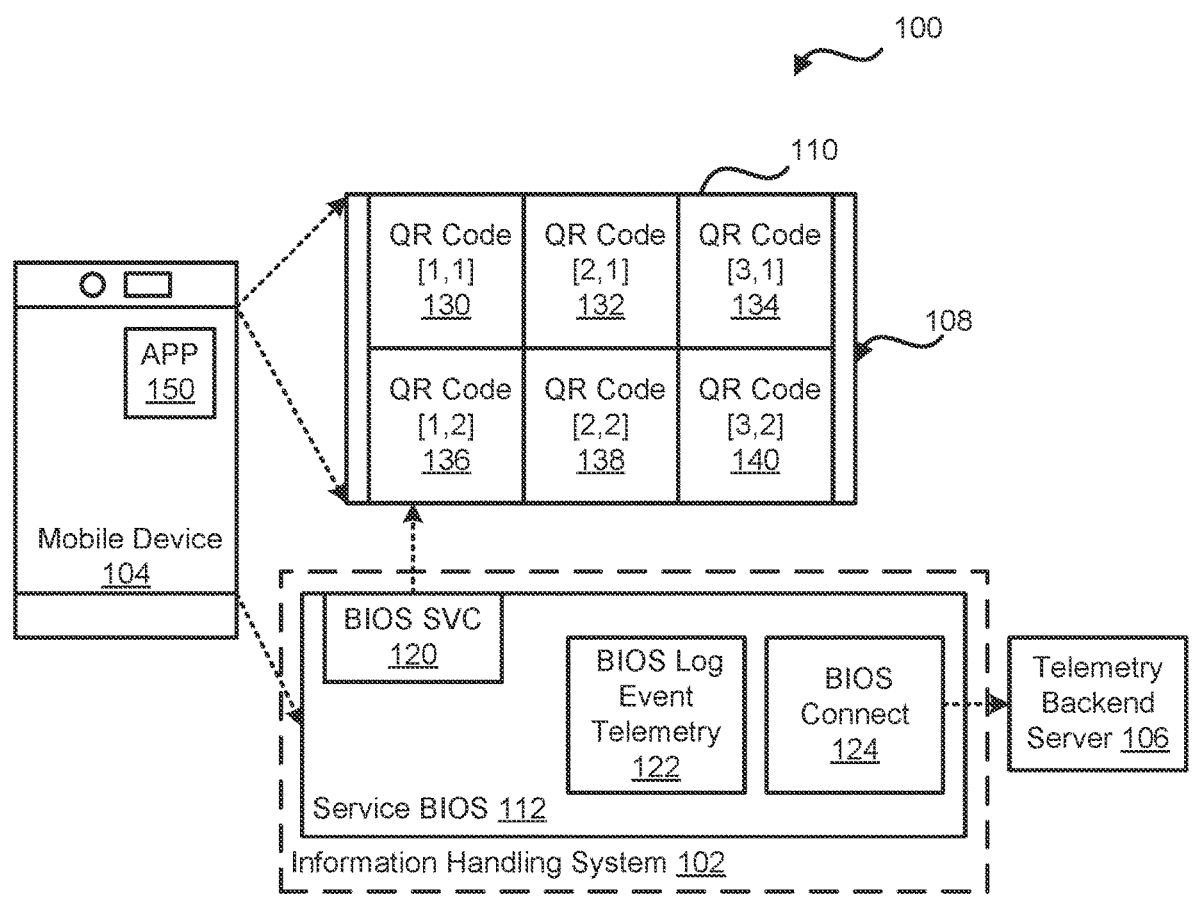
FIG. 1 is a block diagram of a portion of an information handling system according to at least one embodiment of the present disclosure.

FIG. 1 illustrates a system 100 including an information handling system 102, a mobile device 104, a telemetry backend server 106, a display device 108, and a display panel 110 according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling system 102 includes a service basic input/output system (SBIOS) 112, BIOS event telemetry log 122, and a BIOS connect component 124. In an example, SBIOS 112 may communicate with telemetry backend server via BIOS connect 124. Display panel 110 may be integrated with information handling system 102, such as a display screen of a laptop, may be separate from the information handling system, such as in an external display device. Display panel 110 may be any suitable type of panel including, but not limited to, a liquid crystal display (LCD) panel. System 100 and information handling system 102 may include any suitable number of additional components or information handling systems without varying from the scope of this disclosure.

In certain examples, cracks may be created or form in display panel 110 based on a variety of reasons or causes. For example, an individual or owner of display panel 110 may crack the display panel from misuse, the display panel may crack during transportation, or the like. In an example, a manufacturer of display panel 110 may want to data from the individual to determine when the damage or crack in display panel 110 occurred. Information handling system 102 may be improved by data collection to determine whether display panel 110 includes a crack or other defect, authenticate that a visual inspection was performed on the same system that is being serviced, or the like.

During operation of information handling system 102, BIOS service 120 may monitor for a test screen request, such as a LCD built-in self-test (BIST). In certain examples, the test screen request may be any suitable operation or command, such as a hot key sequence being pressed, a command received from mobile device 104, or the like. For example, the hot key sequence may be the combination of any two or more keys, such as 'D' and the power button being pressed. In response to the detection of the test screen request or LCD BIST, BIOS service 120 may generate one or more quick response (QR) codes.

Based on the QR codes being generated, BIOS service 120 may provide the QR codes to display device 108, which in turn may display the QR codes on display panel 110. In an example, BIOS service 120 may include data with the QR codes to indicate where each QR code should be displayed on display screen 110. For example, BIOS service 120 may include data to cause display device 108 to fill display panel 110 with multiple rows and columns of QR codes that may fill the display panel from one side to the other and from the top to the bottom. In certain examples, each QR code may include data representing the row and column for the QR code and error checking code, such as Cyclic Redundancy Check (CRC) 16 error checking, within the QR code. The row and column, the error checking code, and service tag of information handling system 102 may be included within each QR code in any suitable manner known in the art.

As illustrated in FIG. 1, the location of QR code 130 may be column 1 and row 1, the location of QR code 132 may be column 2 row 1, the location of QR code 134 may be column 3 row 1, the location of QR code 136 may be column 1 row 2, the location of QR code 138 may be column 2 row 2, and the location of QR code 140 may be column 3 row 2. In an example, BIOS service 120 may also store the QR codes in BIOS event telemetry log 122 along with an indication that a test for cracked glass was executed. In certain examples, service BIOS 112 may provide the telemetry data, such as the generated QR codes, to telemetry backend server 106.

In an example, an individual associated with information handling system 102 may utilize mobile device 104 and application 150 to test for crack or distortion in display panel 112. Operations described herein with respect to application 150 may be performed by a processor of mobile device 104. The individual may select a soft button associated with application 150, and as a result the application may be opened on mobile device 104. While application 150 is being executed, the individual may take a photograph of QR codes 130, 132, 134, 136, 138, and 140 presented on display panel 112. In response to the photograph being taken, application 150 may determine whether each of QR codes 130, 132, 134, 136, 138, and 140 were properly read. In an example, application 150 may utilize the validation code, such as CRC16, within each of QR codes 130, 132, 134, 136, 138, and 140 to determine whether the corresponding QR code has been accurately read. If a failure of one or more of QR codes 130, 132, 134, 136, 138, and 140 is detected, application 150 may provide the individual with a notification to contact an information technology provider.

In response to application 150 determining that any QR code of QR codes 130, 132, 134, 136, 138, and 140 is damaged, such that the CRC16 value is incorrect, the application may determine that a region of display panel 112 below that QR code is damaged or distorted. In an example, application 150 may report the pass/fail result for each of QR codes 130, 132, 134, 136, 138, and 140 via any suitable manner. For example, application 150 may convert the pass/fail results for each of QR codes 130, 132, 134, 136, 138, and 140 to a bit mapped value. In certain examples, application 150 may set a bit to 1 based on a corresponding QR code being valid and a bit to 0 based on a corresponding QR code being bad or invalid. For example, if all QR codes 130, 132, 134, 136, 138, and 140 are good, application 150 may generate a binary number with 6 bits set to 1, such as 00111111. If QR code 130 is damaged, application 150 may return a 00111110 binary. One of ordinary skill in the art will recognize that a valid QR code may set a bit to 0 and an invalid QR code may set a bit to 1 without varying from the scope of this disclosure. In certain examples, application may return a hexadecimal code corresponding to a binary value without varying from the scope of this disclosure.

In certain examples, application 150 may return the pass/fail result in any suitable manner. For example, application 150 may provide the pass/fail result on a screen of mobile display 104, provide the pass/fail result directly to BIOS service 120, provide the pass/fail result directly to telemetry backend server 108, or the like. If the pass/fail result is provided directly to service BIOS 112, mobile device 104 may provide the result via any suitable communication operation, such as a short-wave communication path. In an example, if application 150 provides the pass/fail result on a screen of mobile display 104, the individual may use a keyboard of information handling system 102 to important the pass/fail result into service BIOS 112. Based on service BIOS 112 pass/fail result, the BIOS may determine one or more regions of display panel 112 that are damaged. In an example, the digital photo captured by application 150 and the pass/fail results may be uploaded to telemetry backend server 108. A manufacturer of display device 110, may utilize the digital photo and the pass/fail results when information handling system 102 and display device 110 are sent for repair. The manufacturer may also use the service tag, timestamp, and other data in the telemetry data of QR codes 130, 132, 134, 136, 138, and 140 to verify that the display panel in the photo is actually display panel 110 provided for service.

Figure 2:
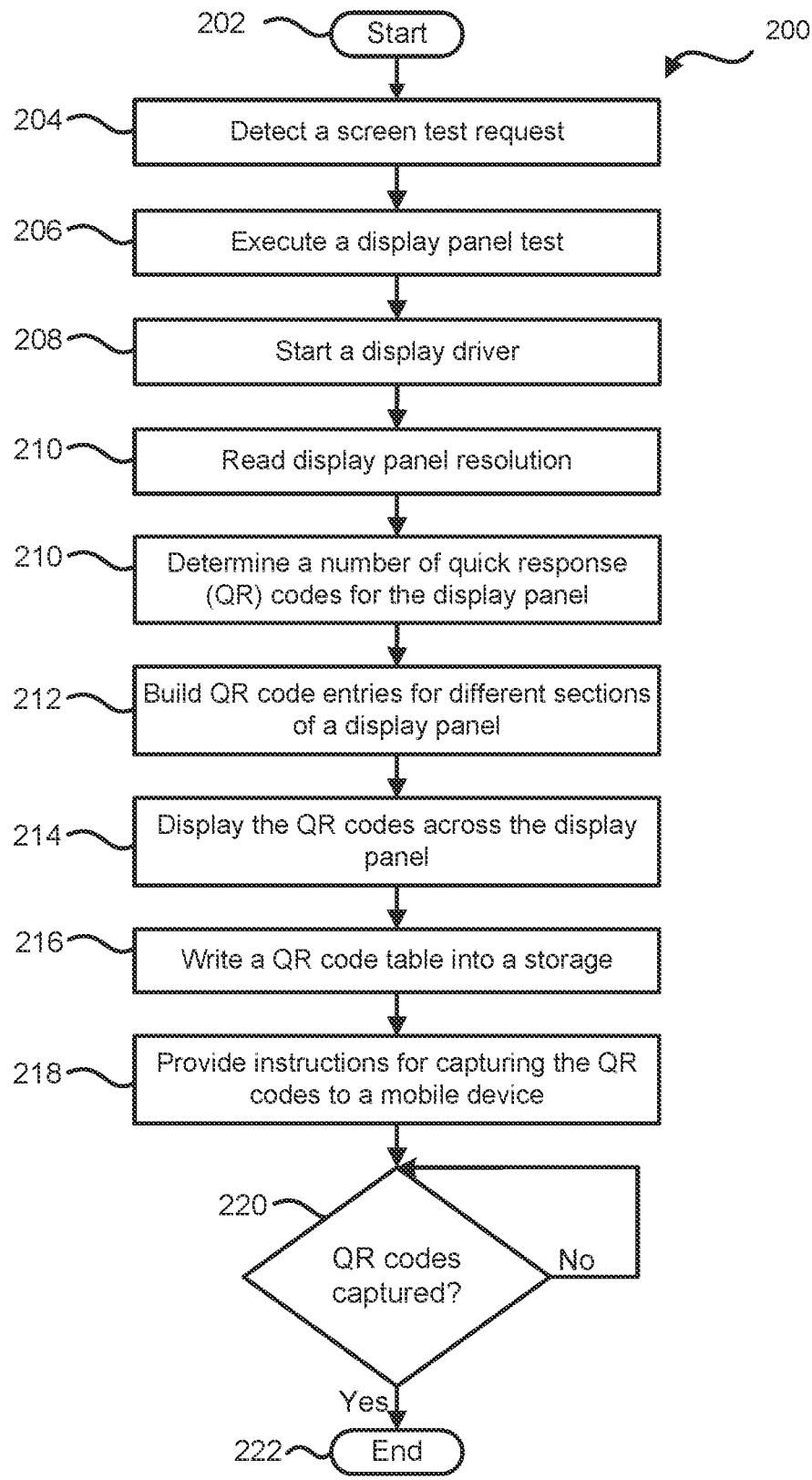
FIG. 2 is a flow diagram of a method for providing multiple quick response codes on a display panel according to at least one embodiment of the present disclosure.

FIG. 2 is a flow diagram of a method for providing multiple quick response (QR) codes on a display panel according to at least one embodiment of the present disclosure, starting at block 202. In an example, method 300 may be performed by any suitable component including, but not limited to, service BIOS 112 and display panel 110 of FIG. 1. It will be readily appreciated that not every method step set forth in this flow diagram is always necessary, and that certain steps of the methods may be combined, performed simultaneously, in a different order, or perhaps omitted, without varying from the scope of the disclosure.

At block 204, a screen test request is detected. In an example, the screen test request may be any suitable event or command. For example, the screen test request may be a command received from a mobile device, a hot key sequence, or the like. In an example, the hot key sequence may be any suitable combination of keys including, but not limited to, the 'D' key on a keyboard and a power button being pressed as the same time.

At block 206, a cracked LCD panel test is performed. In an example, a processor, such as processor 402 or 404 of FIG. 1, or embedded controller may perform the cracked LCD panel test by providing a current through the panel and determining electronically whether LCD electronics have been damaged. If a LCD panel crack was detected, the processor or embedded controller may pass Cracked_Panel_True Bootflag to UEFI and start a Power On Self Test (POST). If a panel crack was not detected, the processor or embedded controller may pass Cracked_Panel_False Bootflag to UEFI and start the POST.

At block 208, a UEFI graphics (GOP) driver is started. At block 210, a resolution of a display panel is read. In an example, the resolution may be read from the UEFI GOP driver of the BIOS. At block 212, a number of QR codes that may fit within the display panel is determined. In an example, the number of QR codes is determined based on both a X direction of the display panel and a Y direction of the display panel.

At block 214, QR code entries for different sections of the display panel are built. In an example, each QR code may include any suitable data including, but not limited to, a service tag for the information handling system, a maximum X direction value, a maximum Y direction value, a timestamp, and the bootflag from the LCD panel test. In certain examples, the bootflag may be either Cracked_Panel_True or Cracked_Panel_False. In an example, a QR code may also include a X and Y coordinate, or column and row coordinate, for the QR code. The QR code may be encrypted in a manner known by an application on a mobile device, a back-end server, or the like. Each QR code may include CRC16 error checking data.

At block 216, the QR codes are displayed across the display panel. In an example, the QR codes may be scaled to fill every available row and column of the display panel. At block 218, the QR codes are written into a storage, such as a telemetry log. At block 220, instructions for capturing the QR codes are provided to a mobile device. At block 222, a determination is made whether the QR codes have been captured by a mobile device. In certain examples, the mobile device may provide a capture completion notification to a BIOS of the information handling system when the QR codes have been captured, a particular key may be pressed on a keyboard to identify that the QR codes have been captured, or the like. In response to a notification, via a signal from the mobile device or a particular key being pressed, indicating that the QR codes have been captured, the flow ends at block 224.

Figure 3:
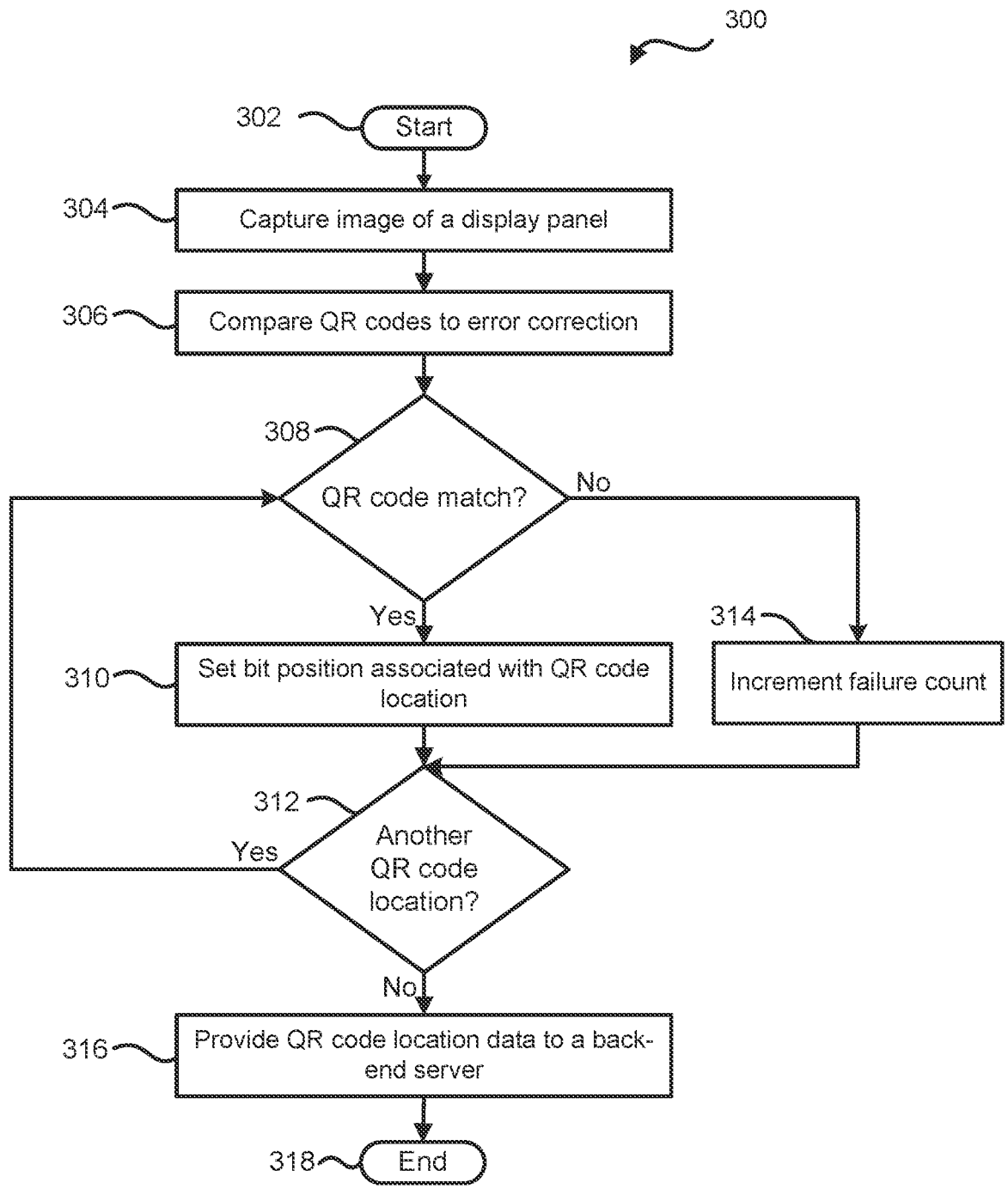
FIG. 3 is a flow diagram of a method for determining a validity of a quick response code according to at least one embodiment of the present disclosure.

FIG. 3 is a flow diagram of a method for determining a validity of a quick response code according to at least one embodiment of the present disclosure, starting at block 302. In an example, method 300 may be performed by any suitable component including, but not limited to, mobile device 104 of FIG. 1. It will be readily appreciated that not every method step set forth in this flow diagram is always necessary, and that certain steps of the methods may be combined, performed simultaneously, in a different order, or perhaps omitted, without varying from the scope of the disclosure.

At block 304, an image of a display panel is captured. In an example, the image of the display panel may include multiple QR codes and the QR codes may be arranged in columns and rows within the display panel. In certain examples, the captured QR codes may include any suitable data including, but not limited to, CRC16 data, a service tag, maximum_X value, maximum_Y value, a timestamp, and LCD crack detection results. At block 306, QR codes are compared to error correction data. In an example, the captured value of the QR code may be compared to a CRC16 value embedded within the QR code.

At block 308, a determination is made whether the captured QR code matches the correction data. If the captured QR code matches the correction data, a bit position associated with the QR code location is set to a particular value at block 310. At block 312, a determination is made whether another QR code location is located on the display panel. If another QR code location is not on the display panel, the flow continues at block 316.

If another QR code location is on the display panel, the flow continues as stated above at block 308. At block 308, if the QR code does not match the correction data, a failure count is incremented at block 314 and the flow continues at block 312. At block 316, the QR code location data is provided to a backend server, and the flow ends at block 318. In an example, the data provided to the backend server may include, but is not limited to, a digital photo captured of the display panel, a service tag of the information handling system, a maximum X value, a maximum Y value, a timestamp, and bitmap. In certain examples, the bitmap may include multiple bits and each bit may correspond to a different QR code location on the display panel. A value of each bit may indicate whether the corresponding QR code location on the display panel is damaged.

Figure 4:
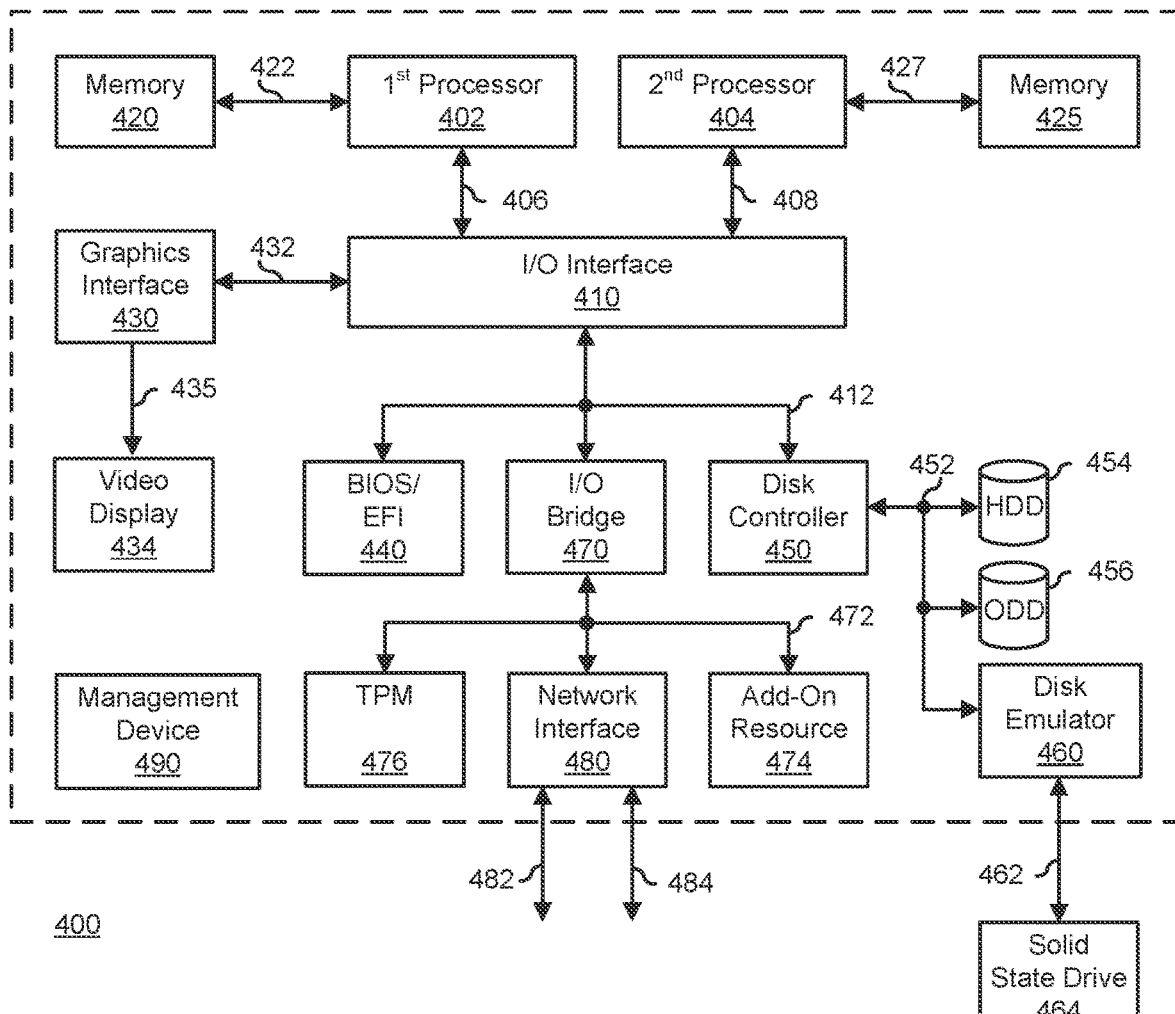
FIG. 4 is a block diagram of a general information handling system according to an embodiment of the present disclosure.

FIG. 4 shows a generalized embodiment of an information handling system 400 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below and operates to perform one or more of the methods described below. Information handling system 400 includes a processors 402 and 404, an input/output (I/O) interface 410, memories 420 and 425, a graphics interface 430, a basic input and output system/universal extensible firmware interface (BIOS/UEFI) module 440, a disk controller 450, a hard disk drive (HDD) 454, an optical disk drive (ODD) 456, a disk emulator 460 connected to an external solid state drive (SSD) 462, an I/O bridge 470, one or more add-on resources 474, a trusted platform module (TPM) 476, a network interface 480, a management device 490, and a power supply 495. Processors 402 and 404, I/O interface 410, memory 420, graphics interface 430, BIOS/UEFI module 440, disk controller 450, HDD 454, ODD 456, disk emulator 460, SSD 462, I/O bridge 470, add-on resources 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to I/O interface 410 via processor interface 406, and processor 404 is connected to the I/O interface via processor interface 408. Memory 420 is connected to processor 402 via a memory interface 422. Memory 425 is connected to processor 404 via a memory interface 427. Graphics interface 430 is connected to I/O interface 410 via a graphics interface 432 and provides a video display output 436 to a video display 434. In a particular embodiment, information handling system 400 includes separate memories that are dedicated to each of processors 402 and 404 via separate memory interfaces. An example of memories 420 and 430 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 440, disk controller 450, and I/O bridge 470 are connected to I/O interface 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 410 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources. BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 4394 (Firewire) interface, a proprietary interface, or a combination thereof. Alternatively, solid-state drive 464 can be disposed within information handling system 400.

I/O bridge 470 includes a peripheral interface 472 that connects the I/O bridge to add-on resource 474, to TPM 476, and to network interface 480. Peripheral interface 472 can be the same type of interface as I/O channel 412 or can be a different type of interface. As such, I/O bridge 470 extends the capacity of I/O channel 412 when peripheral interface 472 and the I/O channel are of the same type, and the I/O bridge translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as I/O interface 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 400. In particular, management device 490 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400.

Management device 490 can operate off of a separate power plane from the components of the host environment so that the management device receives power to manage information handling system 400 when the information handling system is otherwise shut down. An example of management device 490 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 490 may further include associated memory devices, logic devices, security devices, or the like, as needed, or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a display panel; and
   a basic input/output system (BIOS) in communication with the display panel, the BIOS to:
      read a resolution of the display panel;
      calculate a number of multiple quick response (OR) codes that fit within the display area of the display panel;
      after the number of the multiple QR codes are calculated, build multiple QR codes;
      provide the multiple QR codes to the display panel, wherein the multiple QR codes fill an entire display area of the display panel; and
      store the multiple QR codes in a storage of the BIOS.

2. The information handling system of claim 1, wherein BIOS further to: provide instructions for capturing the multiple QR codes.

3. The information handling system of claim 1, wherein BIOS further to: provide the multiple QR codes to a telemetry backend server.

4. The information handling system of claim 1, wherein each of the multiple QR codes includes an error correction code.

5. The information handling system of claim 1, wherein each of the multiple QR codes includes a corresponding display location on the display panel.

6. The information handling system of claim 1, wherein each of the multiple QR codes includes a service tag for the information handling system, and a timestamp of when the multiple QR codes were built.

7. The information handling system of claim 1, wherein the display panel is external to the information handling system.

8. The information handling system of claim 1, wherein each of the multiple QR codes includes an error correction code.

9. The information handling system of claim 1, wherein each of the multiple QR codes includes a corresponding display location on the display panel.

10. The information handling system of claim 1, wherein each of the multiple QR codes includes a service tag for the information handling system, and a timestamp of when the multiple QR codes were built.

11. A method comprising:
    reading a resolution of the display panel;
    calculating a number of multiple quick response (QR) codes that fit within the display area of the display panel;
    after the calculating of the number of the multiple QR codes, building, by a basic input/output system (BIOS) of an information handling system, multiple QR codes;
    providing, by the BIOS, the multiple QR codes to the display panel, wherein the multiple QR codes fill an entire display area of the display panel; and
    storing the multiple QR codes in a storage of the BIOS.

12. The method of claim 11, further comprising providing instructions for capturing the multiple QR codes.

13. The method of claim 11, further comprising providing the multiple QR codes to a telemetry backend server.

14. The method of claim 11, wherein each of the multiple QR codes includes an error correction code.

15. The method of claim 11, wherein each of the multiple QR codes includes a corresponding display location on the display panel.

16. The method of claim 11, wherein each of the multiple QR codes includes a service tag for the information handling system, and a timestamp of when the multiple QR codes were built.

17. The method of claim 15, wherein the display panel is external to the information handling system.

18. An information handling system comprising:
    a display panel; and
    a basic input/output system (BIOS) in communication with the display panel, the BIOS to:
       receive a test display screen request;
       in response to the test display screen request, read a resolution of the display panel;
       calculate a number of quick response (QR) codes that fit within a display area of the display panel;
       build multiple QR codes;
       provide the multiple QR codes to the display panel, wherein the multiple QR codes fill the display area of the display panel; and
       store the multiple QR codes in a storage of the BIOS.

* * * * *